US010947952B2

(12) United States Patent
Shi et al.

(10) Patent No.: US 10,947,952 B2
(45) Date of Patent: Mar. 16, 2021

(54) FLOATING WIND-WAVE INTEGRATED POWER GENERATION SYSTEM

(71) Applicant: Dalian University of Technology, Dalian (CN)

(72) Inventors: Wei Shi, Dalian (CN); Zhiyu Jiang, Dalian (CN); Zhengru Ren, Dalian (CN); Dezhi Ning, Dalian (CN)

(73) Assignee: Dalian University of Technology, Dalian (CN)

( * ) Notice: Subject to any disclaimer, the term of this patent is extended or adjusted under 35 U.S.C. 154(b) by 11 days.

(21) Appl. No.: 16/339,570

(22) PCT Filed: Sep. 11, 2017

(86) PCT No.: PCT/CN2017/101165
§ 371 (c)(1),
(2) Date: Apr. 4, 2019

(87) PCT Pub. No.: WO2019/047194
PCT Pub. Date: Mar. 14, 2019

(65) Prior Publication Data
US 2020/0040865 A1    Feb. 6, 2020

(51) Int. Cl.
*F03B 13/00* (2006.01)
*F03B 13/24* (2006.01)
(Continued)

(52) U.S. Cl.
CPC .............. *F03B 13/24* (2013.01); *F03D 9/008* (2013.01); *E02B 2017/0091* (2013.01);
(Continued)

(58) Field of Classification Search
CPC ........ F03B 13/14; F03B 13/142; F03B 13/24; F05B 2210/40; F05B 2240/93;
(Continued)

(56) References Cited

U.S. PATENT DOCUMENTS 1,742,068 A * 12/1929 Grasset ................... F03B 13/22
405/77
4,058,979 A * 11/1977 Germain ................. F03D 9/17
60/327

(Continued)

FOREIGN PATENT DOCUMENTS

CA          2920063 A1 *  2/2014  .............. F03B 13/24
CN       105604777 A      5/2016
(Continued)

*Primary Examiner* — Julio C. Gonzalez
(74) *Attorney, Agent, or Firm* — Muncy, Geissler, Olds & Lowe, P.C.

(57) ABSTRACT

The present invention relates generally to the offshore renewable energy utilization technology. A novel floating wind-wave integrated power generation system is based on the braceless semi-submersible floating wind turbine concept and the oscillating water column (OWC) wave energy generator. The integrated system includes the offshore wind energy system and the oscillating water column wave energy system. The novel floating wind-wave integrated power generation system transfers the rise and fall movement of the water column into the air in and out movement which is converted into the electricity by the air turbine generator. This invention makes good use of pontoons at of the semi-floating platform and the mooring lines. Since the wave energy system will move with the wave movement, which will reduce the power generation efficiency. The pontoon can help to mitigate this movement. The mooring system can further prevent the movement of the wave energy device. This invention uses the braceless structure, which simplifies the construction process and reduce the fatigue issues for the braces. Compared with the traditional three columns semi-submersible wind turbine, this invention enlarges the water plane area. The moment of inertia for hydrostatic stability is enhanced, and the stability of the floating foundation is improved.

5 Claims, 3 Drawing Sheets

(51) Int. Cl.
 *F03D 9/00* (2016.01)
 *F03D 9/25* (2016.01)
 *F03D 13/20* (2016.01)
 *F03D 13/25* (2016.01)
 *E02B 17/00* (2006.01)

(52) U.S. Cl.
 CPC ............... *F03D 9/25* (2016.05); *F03D 13/22* (2016.05); *F03D 13/25* (2016.05)

(58) Field of Classification Search
 CPC ......... Y02E 10/32; Y02E 10/38; F03D 9/008; F03D 9/25; F03D 13/22; F03D 13/25
 See application file for complete search history.

(56) References Cited

U.S. PATENT DOCUMENTS

| | | | | |
|---|---|---|---|---|
| 4,086,775 | A * | 5/1978 | Peterson, Jr. ........... | F03B 13/22 405/76 |
| 4,098,081 | A * | 7/1978 | Woodman ............. | F03B 13/266 417/100 |
| 4,741,157 | A * | 5/1988 | Nishikawa ............ | F03B 13/142 290/53 |
| 4,858,434 | A * | 8/1989 | Masuda ................ | F03B 13/142 60/398 |
| 7,355,298 | B2 * | 4/2008 | Cook .................... | F03B 13/148 290/53 |
| 8,030,789 | B2 * | 10/2011 | Ortiz .................... | F03B 13/142 290/42 |
| 2004/0163387 | A1 * | 8/2004 | Pineda ................. | F03B 13/142 60/495 |
| 2009/0206608 | A1 * | 8/2009 | Koola .................. | F03B 13/142 290/53 |
| 2010/0038912 | A1 * | 2/2010 | McCarthy ............... | F03B 13/24 290/53 |
| 2010/0209236 | A1 * | 8/2010 | Freeman ............... | F03B 13/142 415/208.1 |
| 2011/0225965 | A1 * | 9/2011 | Van Niekerk ......... | F03B 13/142 60/497 |

FOREIGN PATENT DOCUMENTS

| | | | | |
|---|---|---|---|---|
| GB | 2365385 | A | 2/2002 | |
| GB | 2460303 | A * | 12/2009 | ............ F03B 13/142 |
| JP | 57171080 | A * | 10/1982 | ............ F03D 9/008 |
| JP | 59145373 | A * | 8/1984 | ............ F03B 13/142 |
| KR | 100928569 | B1 | 11/2009 | |
| KR | 20120002401 | U | 4/2012 | |
| WO | WO-2007057013 | A1 * | 5/2007 | ............. F03B 13/24 |
| WO | WO 2013150320 | A2 | 10/2013 | |

* cited by examiner

FLOATING WIND-WAVE INTEGRATED POWER GENERATION SYSTEM

TECHNICAL FIELD

The present invention relates generally to the offshore renewable energy utilization technology, and more particularly, to a novel floating wind-wave integrated power generation system. Based on semisubmersible floating platform, the invention combines wind energy device and oscillating water column wave energy device as an integrated power generation system.

BACKGROUND

Wind energy is one of the most promising renewable energy resources. Offshore wind energy has become a new development direction for wind energy research in the world and attracts much attention from many countries. With the rising percentage of the offshore wind energy in the total energy consumption year after year, the floating wind turbine foundation gets increasing attention. Due to its low energy conversion efficiency and high unit cost, the commercialization of the wave energy generation device is limited. Certain wind speed, strong wind condition, and good potential to develop wave energy should be primarily cared when selecting the wind farm sites. Combining the offshore wind and wave energy resources can increase the overall power generation capability of the offshore wind farm and the efficiency of an individual turbine, and it will be an effective way to comprehensively utilize the marine renewable energy resources.

SUMMARY

In order to make better use of the marine energy, the present invention presents a combined power generation device of floating wind energy and wave energy. A braceless semi floating platform is used to build an integrated wind and wave energy system in the ocean, forming an integrated power generation system. The combination aims to improve the utilization ratio of floating foundation, to reduce the total cost, and to enhance the overall economy of offshore wind farms. The reducing cost of electricity will promote the application of wave energy.

Technical Scheme of the Invention

A novel floating wind-wave integrated power generation system is based on the braceless semi-submersible floating wind turbine concept and the oscillating water column (OWC) wave energy generator. The integrated system includes the offshore wind energy system and the oscillating water column wave energy system 5. The offshore wind energy system consists of offshore wind turbine 1, tower 2 and the braceless semi-submersible floating platform. The floating platform includes three columns 6, pontoons 4 and mooring lines 3.

The OWC wave energy system 5 described in this invention is located outer of the columns 6 and fixed to pontoons 4. OWC wave energy system 5 described above consists of chamber cover 7, water inlet 8 and air turbine generator 10. The chamber cover 7 is an L-shaped cylinder whose bottom is fixed to the pontoons 4. Air chamber 9 is formed between chamber cover 7 and columns 6. The water inlet 8 is set at the connection end of chamber cover 7 and pontoon 4. At the other end of the chamber cover 7, there is an outlet where air turbine generator 10 is installed. During operations, the system is submerged in the water, and the wave forces will drive the water column within the chamber 9 up and down, driving the air in and out (inhalation and exhalation) of the chamber 9 typically through air turbine generator 10 for power generation.

The described air chamber 9 uses a cone-shaped air outlet to increase the pressure of the airflow. Thus, the air turbine generator 10 could be pushed more quickly to improve the power generation efficiency.

The described water inlet 8 is heading the waves to improve the power generation efficiency.

The described air turbine generator 10 uses a bidirectional generator.

The novel floating wind-wave integrated power generation system transfers the rise and fall movement of the water column into the air in and out movement which is converted into the electricity by the air turbine generator. This invention makes good use of pontoons at of the semi-floating platform and the mooring lines. Since the wave energy system will move with the wave movement, which will reduce the power generation efficiency. The pontoon can help to mitigate this movement. The mooring system can further prevent the movement of the wave energy device.

This invention uses the braceless structure, which simplifies the construction process and reduce the fatigue issues for the braces. Compared with the traditional three columns semi-submersible wind turbine, this invention enlarges the water plane area. The moment of inertia for hydrostatic stability is enhanced, and the stability of the floating foundation is improved.

In the novel floating wind-wave integrated power generation system, the OWC wave energy generators are integrated to each column of the braceless semi-submersible platform. This every integrated system includes three wave energy devices which can effectively improve the utilization efficiency of the wave energy and reduce the cost.

Benefits of this Invention

The braceless semi-submersible floating platform has several advantages, simple structure, construction convenience, low installation cost, and suitability for various water depth.

Combination of the offshore turbine and wave energy power generation device can share the offshore platform, transformer stations and the power transmission equipment. The total power output of the system is improved. The generation capacity and the effective working hour increase. The capital expenditure is expected to reduce, too.

The symmetric distribution of the wave energy device along the circumference improves the stability of the system.

The novel floating wind-wave integrated power generation system improves the effective utilization deep water area, reduce the construction cost and maintenance expense. Existing wind turbine technology with high technical maturity level is sufficiently used. This system will promote commercialization of the wave energy device. It is a reliable deep sea renewable energy power platform.

In the figures, 1 Offshore wind turbine; 2 Tower; 3 Mooring line; 4 Pontoon; 5 OWC wave energy device; 6 Columns; 7 Chamber cover; 8 Water inlet; 9 Air chamber; 10 Air turbine generator.

DETAILED DESCRIPTION

Based on the figures and the technical scheme, the implementing ways are described further.

Figure 1:
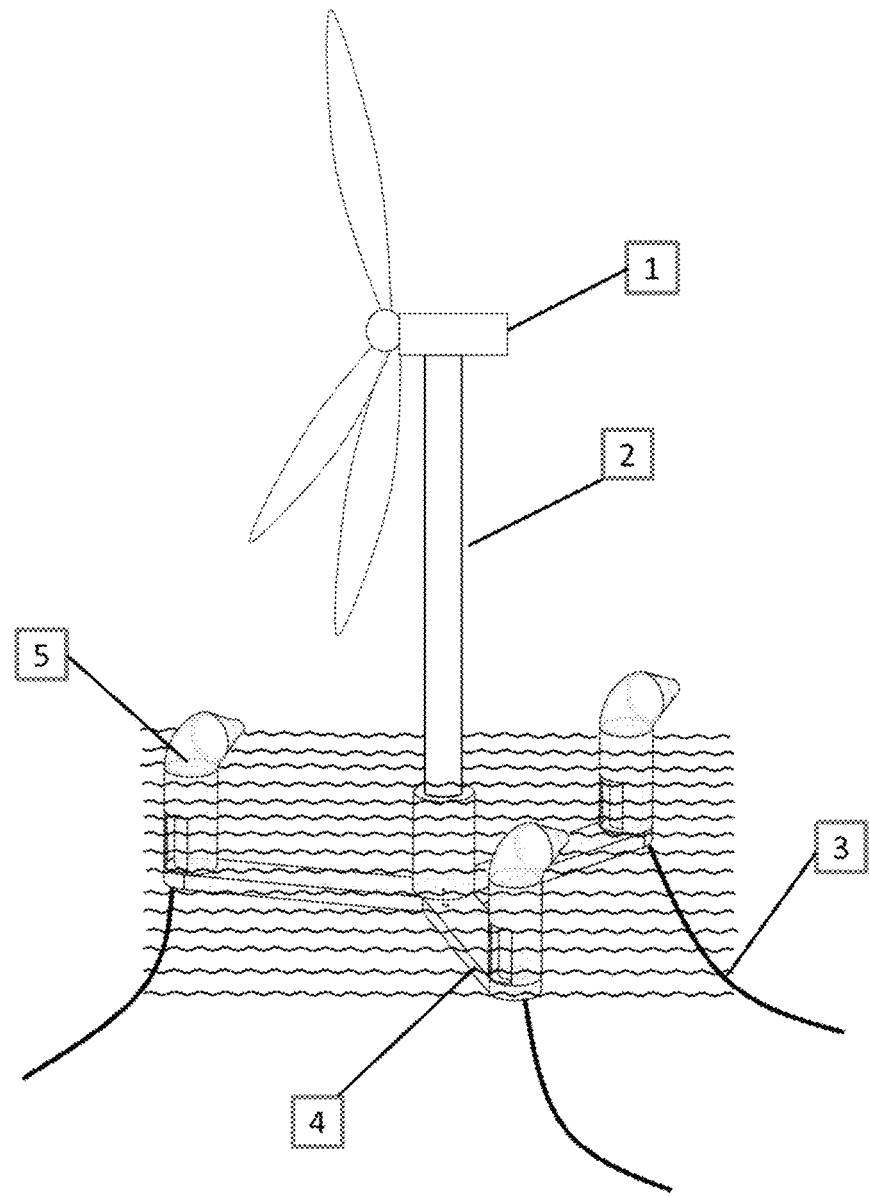
FIG. 1 is the schematic illustration of three-dimensional structure of the novel floating wind-wave integrated power generation system.
Figure 2:
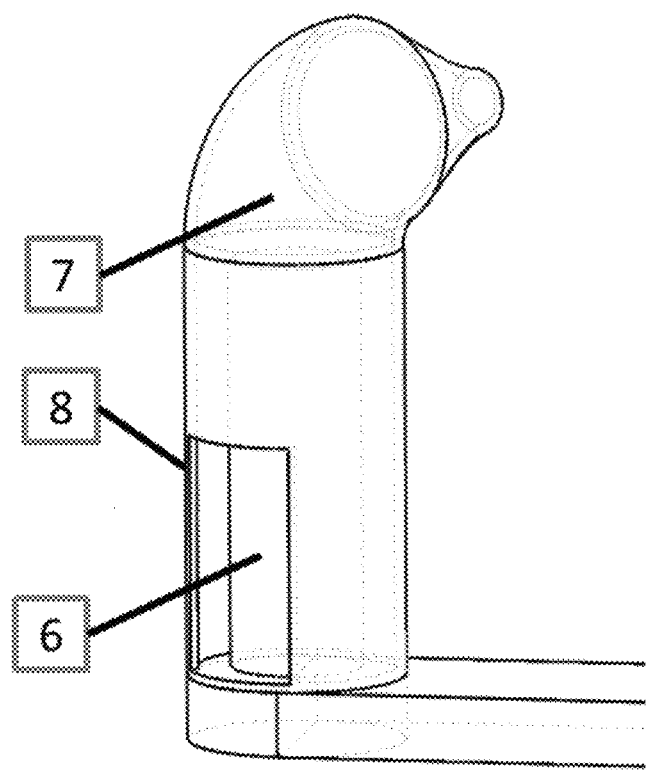
FIG. 2 is the schematic illustration of the oscillating water column wave energy device.
Figure 3:
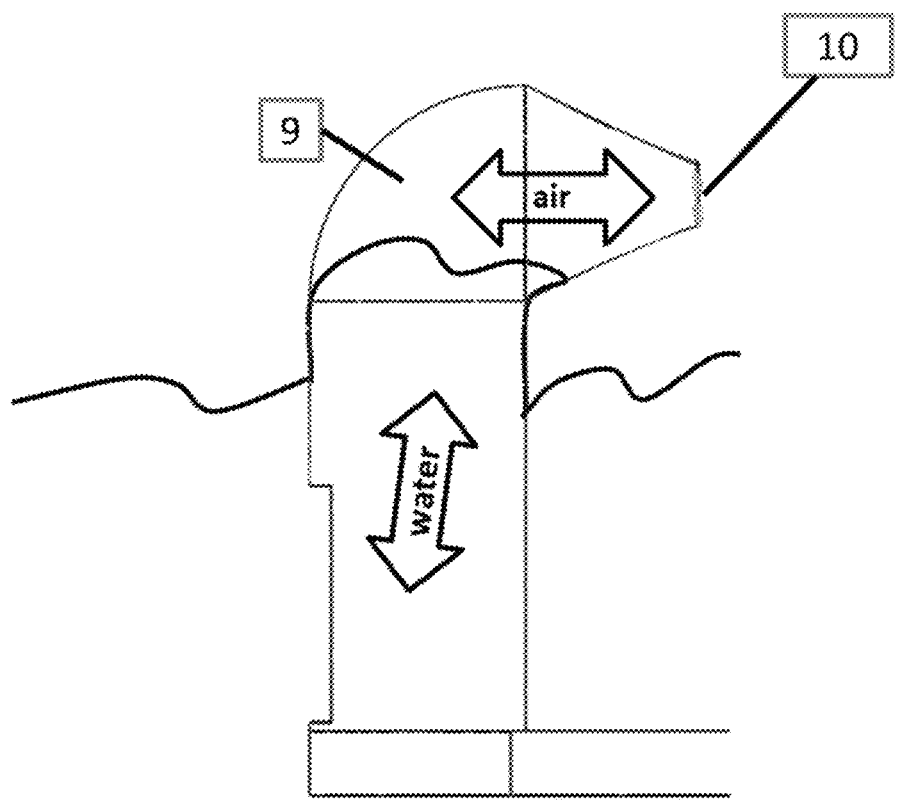
FIG. 3 is the illustration of the working mechanism of the OWC wave energy device.

As shown in FIG. 1, wind turbine 1, through tower 2 is connected to the seabed by a semisubmersible platform which is composed of pontoon 4 and columns 6 and the anchor mooring lines 3. Wind turbine 1 will rotate with respect to its main shaft, which is connected to rotor blades driven by the wind flow, which convert the wind energy into the mechanical energy of the shaft. Through the gear box, the mechanical energy of the high speed shaft is converted into electrical energy by generator. In another way, the wave forces drives the water column within the chamber 9 to rise and fall, driving the air in and out of the chamber 9 typically air turbine generator 10. The bi-direction air turbine generator 10 will convert the mechanical energy into electrical energy from rise and fall of the water column. It can generate the electricity continuously and has high efficiency.

Under the action of wind force, wind turbine produces electricity which is transmitted to the power grid by the transmission system and finally to end-users on land. The chamber cover 7 of the OWC wave energy device 5 and the pontoon 4 at the bottom of the semi-submersible platform are connected. The water enters into the chamber 9 through the inlet 8 to cause the water column rise and fall in the air chamber 9. The movement of the water column push the air in chamber 9 in and out through the air outlet at the top of the air chamber, which drive the air turbine generator 10 for power production.

There are advantages of the described novel floating wind-wave integrated power generation system, including simple structure, installation and construction convenience, wide application of water depth and low cost. Wind and wave power generation are installed on the same support structure and share the floating platform and the power transmission system, which will reduce the total cost efficiently. The stable and reasonable structure further proves the feasibility and the technical maturity of this invention.

We claim:

1. A novel floating wind-wave integrated power generation system, wherein the power generation system includes offshore wind power device and oscillating water column (OWC) wave energy device; the offshore wind power device includes offshore wind turbine, tower, and a braceless semisubmersible floating, the braceless semisubmersible floating consists of three columns, pontoon and mooring system;

the OWC wave energy device is located outer of the columns and fixed to pontoons; the OWC wave energy device consists of chamber wall, water inlet and air turbine generator; the chamber wall is an L-shaped cylinder whose bottom is fixed to the pontoons; the space between the chamber wall and the column is formed as an air chamber; the water inlet is provided on one end of the chamber wall and is located near the end of the fixed connection between the chamber wall and the pontoon; an outlet is set at the other end of the chamber wall, and air turbine generator is installed at the outlet; during operation, the system is submerged in the water, and the wave forces will drive the water column within the air chamber up and down, driving the air in and out of the air chamber through air turbine generator for power generation; and under the action of wind force, the offshore wind turbine produces electricity, and under the action of wave force, the OWC wave energy device also produces electricity, both produced electricity is transmitted to the power grid by the transmission system and finally to end-users on land.

2. The novel floating wind-wave integrated power generation system according to claim 1, wherein the air chamber uses a cone-shaped air outlet to increase the pressure of the airflow; thus, the air turbine generator could be pushed more quickly to improve the power generation efficiency.

3. The novel floating wind-wave integrated power generation system according to claim 1, wherein the water inlet is aligned to the main wave direction to improve the power generation efficiency.

4. The novel floating wind-wave integrated power generation system according to claim 1, wherein the air turbine generator uses a bidirectional generator.

5. The novel floating wind-wave integrated power generation system according to claim 3, wherein the air turbine generator uses a bidirectional generator.

* * * * *